United States Patent Office 2,744,909
Patented May 8, 1956

2,744,909

2-(ORTHO-PHENYLBENZYL) IMIDAZOLINE AND ACID ADDITION SALTS

Merrill Eugene Speeter, Kalamazoo, Mich., assignor to Bristol Laboratories Inc., Syracuse, N. Y., a corporation of New York No Drawing. Application June 27, 1955, Serial No. 518,351

3 Claims. (Cl. 260—309.6)

This invention relates to a new class of organic compounds possessing therapeutic value; and more particularly, to certain imidazolines and to acid addition salts thereof.

This application is a continuation-in-part of my copending application of Serial No. 296,929, filed July 2, 1952, which in turn was a continuation-in-part of my copending application of Serial No. 146,927, filed February 28, 1950.

The free base of the new compound may be represented by the following general formula:

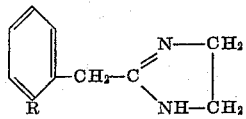

where R is phenyl.

The acid addition salts of this compound are also included within the present invention. Some examples of the nontoxic acid addition salts of the free base with inorganic or organic acids which may be prepared by the methods hereinafter described are the hydrochloride, hydrobromide, hydroiodide, sulfate, phosphate, maleate, acetate, citrate, oxalate, succinate, benzoate, tartrate, and the like.

The compounds of this invention are also useful for their ability to increase blood pressure.

The following example will serve to illustrate the invention without limiting it thereto.

*Example*

2-(ortho-phenylbenzyl)-imidazoline is prepared by heating 30 grams (0.124 mole) of ethyl ortho-biphenyl-acetate and 22.3 grams (0.37 mole) of ethylenediamine in a pressure bottle on a steam bath for forty-eight hours. Upon standing several hours, a solid separated from the reaction mixture which was filtered and recrystallized from acetic acid. The solid melted at 214°–216° C. and was insoluble in dilute hydrochloric acid. The filtrate from the solid was distilled under reduced pressure. A fraction which had a boiling point of 196°–200° C. at 4.5 mm. was obtained which crystallized. The solid was recrystallized first from cyclohexane and then from methyl isobutyl ketone to obtain a crystalline product having a melting point of 112°–113° C., the yield thereof being 8 grams. The acid addition salt of the free base may be prepared by dissolving it in isopropyl alcohol and saturating this solution with dry hydrogen chloride in the cold. The crystalline hydrogen chloride, which forms and slowly separates, is collected by filtration.

*Analysis.*—Calculated for $C_{16}H_{16}N_2 \cdot HCl$:

|   | Calculated | Found |
|---|---|---|
| C | 81.32 | 81.20 |
| H | 6.82 | 7.06 |

I claim:

1. A compound selected from the group consisting of 2 - (ortho - phenylbenzyl)-imidazoline and acid addition salts thereof.

2. The compound 2-(ortho-phenylbenzyl)-imidazoline.

3. The compound 2-(-ortho-phenylbenzyl)-imidazoline hydrochloride.

No references cited.